(12) United States Patent
Li et al.

(10) Patent No.: US 9,081,570 B2
(45) Date of Patent: Jul. 14, 2015

(54) NETWORK ACCESS DEVICE WITH FLEXIBLE PRECISE LOW-POWER REMOTE WAKE-UP MECHANISM APPLICABLE IN VARIOUS APPLICATION LAYER HANDSHAKE PROTOCOLS

(71) Applicant: Realtek Semiconductor Corp., Hsinchu (TW)

(72) Inventors: Ting-Ying Li, Hsinchu (TW);
Kuang-Yu Yen, Taichung (TW);
Jia-Ching Shen, Taipei (TW); Yu-Chen Liu, Taipei (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 239 days.

(21) Appl. No.: 13/667,397

(22) Filed: Nov. 2, 2012

(65) Prior Publication Data
US 2013/0117586 A1  May 9, 2013

(30) Foreign Application Priority Data

Nov. 3, 2011  (TW) .............. 100140082 A

(51) Int. Cl.
| G06F 1/00 | (2006.01) |
| G06F 1/32 | (2006.01) |
| H04L 12/12 | (2006.01) |
| H04L 12/40 | (2006.01) |

(52) U.S. Cl.
CPC .............. *G06F 1/3209* (2013.01); *H04L 12/12* (2013.01); *H04L 12/40039* (2013.01); *Y02B 60/34* (2013.01); *Y02B 60/35* (2013.01)

(58) Field of Classification Search
CPC .. Y02B 60/34; Y02B 60/03; H04L 12/40039; G06F 1/3209; G06F 1/00; G06F 1/32

USPC ................................... 713/310, 323
See application file for complete search history.

(56) References Cited

U.S. PATENT DOCUMENTS

| 5,515,051 | A | * | 5/1996 | Tanaka et al. ................. 341/174 |
| 6,098,100 | A | | 8/2000 | Wey et al. |
| 8,068,433 | B2 | | 11/2011 | Hodges et al. |
| 8,161,301 | B2 | | 4/2012 | Lim et al. |
| 2005/0198280 | A1 | * | 9/2005 | Hall et al. ...................... 709/224 |
| 2007/0211725 | A1 | * | 9/2007 | Kawata et al. ................. 370/392 |
| 2008/0219196 | A1 | * | 9/2008 | Ptasinski ........................ 370/311 |
| 2008/0313481 | A1 | * | 12/2008 | Paljug ............................ 713/323 |
| 2010/0166113 | A1 | * | 7/2010 | Farley et al. ................... 375/316 |
| 2010/0262681 | A1 | * | 10/2010 | Chang et al. .................. 709/221 |
| 2011/0258335 | A1 | * | 10/2011 | Mahamuni .................... 709/230 |

FOREIGN PATENT DOCUMENTS

| CA | 1716879 A | 1/2006 |
| TW | 372379 | 10/1999 |
| TW | 200929942 A | 7/2009 |

* cited by examiner

*Primary Examiner* — Thomas Lee
*Assistant Examiner* — Chad Erdman
(74) *Attorney, Agent, or Firm* — Birch, Stewart, Kolasch & Birch, LLP

(57) ABSTRACT

A network access device is disclosed, having a transceiving circuit, a demodulation circuit, and a control circuit. The transceiving circuit is used to receive network signals. The demodulation circuit is coupled with the transceiving circuit and used to generate data frames according to the network signals. The control circuit is coupled with the demodulation circuit and used to wake up one or more components of an electronic device when at least two fields of the data frame match predetermined values, or when the data frames are received in a predetermined order.

3 Claims, 4 Drawing Sheets

NETWORK ACCESS DEVICE WITH FLEXIBLE PRECISE LOW-POWER REMOTE WAKE-UP MECHANISM APPLICABLE IN VARIOUS APPLICATION LAYER HANDSHAKE PROTOCOLS

CROSS-REFERENCE TO RELATED APPLICATIONS

This application claims the benefit of priority to Patent Application No. 100140082, filed in Taiwan on Nov. 3, 2011; the entirety of which is incorporated herein by reference for all purposes.

BACKGROUND

The disclosure generally relates to a network access device and, more particularly, to the network access device with the remote wake-up mechanism.

Nowadays, electronic devices usually adopt the power saving mechanism to reduce the power consumption in the idle mode or in the light load mode. Moreover, some electronic devices also utilize the remote wake-up mechanism in combination of the power saving mechanism. Thus, the electronic device in the power-saving mode may therefore be waked up by some specific types of packets transmitted by other devices and enter the normal operation mode.

In some applications, the electronic device may be waked up when receiving a "magic packet" or when a field of a packet matches a specific pattern. For example, a magic packet may be defined as a packet whose payload comprises six bytes of FF (in hexadecimal) followed by sixteen repetitions of the MAC address of the electronic device. In other applications, the operation system may also define some specific patterns. The network access device of the electronic device compares a predetermined field of the received packet with the specific patterns to determine whether the electronic device should be waked up.

Moreover, as the widespread use of the wireless devices, the wireless communication channel is crowded with a variety of wireless signals. If the wireless electronic device still adopts the traditional wake-up mechanism of comparing the content of a single packet, the wireless electronic device may be mistakenly waked up (also known as the false alarm). For example, a wireless electronic device may receive signals from the associated access point (AP) and other unassociated APs at the same time. The wireless electronic device should only respond to the wake-up request transmitted from the associated AP but not respond to the wake-up request transmitted from the unassociated APs. When the wireless electronic device still adopts the traditional wake-up mechanism, the wireless electronic device may be constantly waked by the false alarms. The power consumption therefore may not be effectively reduced.

SUMMARY

An example embodiment of a network access device, comprising: a demodulation circuit for generating a first data frame according to network signals received by a transceiving circuit; and a control circuit, coupled with the demodulation circuit, for waking up at least one component of an electronic device when the first data frame matches a first wake-up criterion; wherein the first data frame matches the first wake-up criterion when at least two of a source MAC address field, a destination MAC address field, an ether type field, a source IP address field, a destination IP address field, a source port field, a destination port field, an IP header field, an TCP header field, a frame control field, a source address field, and a destination address field of the first data frame respectively equal to predetermined values or locate in predetermined ranges.

Another example embodiment of a network access device, comprising: a demodulation circuit for generating a first, a second, a third, and a fourth data frames according to network signals received by a transceiving circuit; and a control circuit, coupled with the demodulation circuit, for waking up at least one component of an electronic device when the first data frame matches a first wake-up criterion, the second data frame matches a second wake-up criterion, the third data frame matches a third wake-up criterion, and the fourth data frame matches a fourth wake-up criterion; wherein the first, the second, the third, and the fourth data frames respectively match the first, the second, the third, and the fourth wake-up criterions when at least one of a source MAC address field, a destination MAC address field, an ether type field, a source IP address field, a destination IP address field, a source port field, a destination port field, an IP header field, an TOP header field, a frame control field, a source address field, and a destination address field of the first, the second, the third, and the fourth data frames respectively equal to predetermined values or locate in predetermined ranges.

Another example embodiment of a network access device, comprising: a demodulation circuit for receiving a first network signal and a second network signal received by a transceiving circuit; and a control circuit, coupled with the demodulation circuit, for waking up at least one component of an electronic device when the first network signal matches a first wake-up criterion and the second network signal matches a second wake-up criterion; wherein the first network signal matches the first wake-up criterion and the second network signal matches the second wake-up criterion when the first network signal comprises a first predetermined waveform, the second network signal comprises a second predetermined waveform, and the first network signal and the second network signal are received within a predetermined time range.

It is to be understood that both the foregoing general description and the following detailed description are example and explanatory only and are not restrictive of the invention, as claimed.

All of the drawings are arranged in accordance with at least some embodiments described herein.

DETAILED DESCRIPTION

Reference will now be made in detail to embodiments of the invention, which are illustrated in the accompanying drawings.

Figure 1:
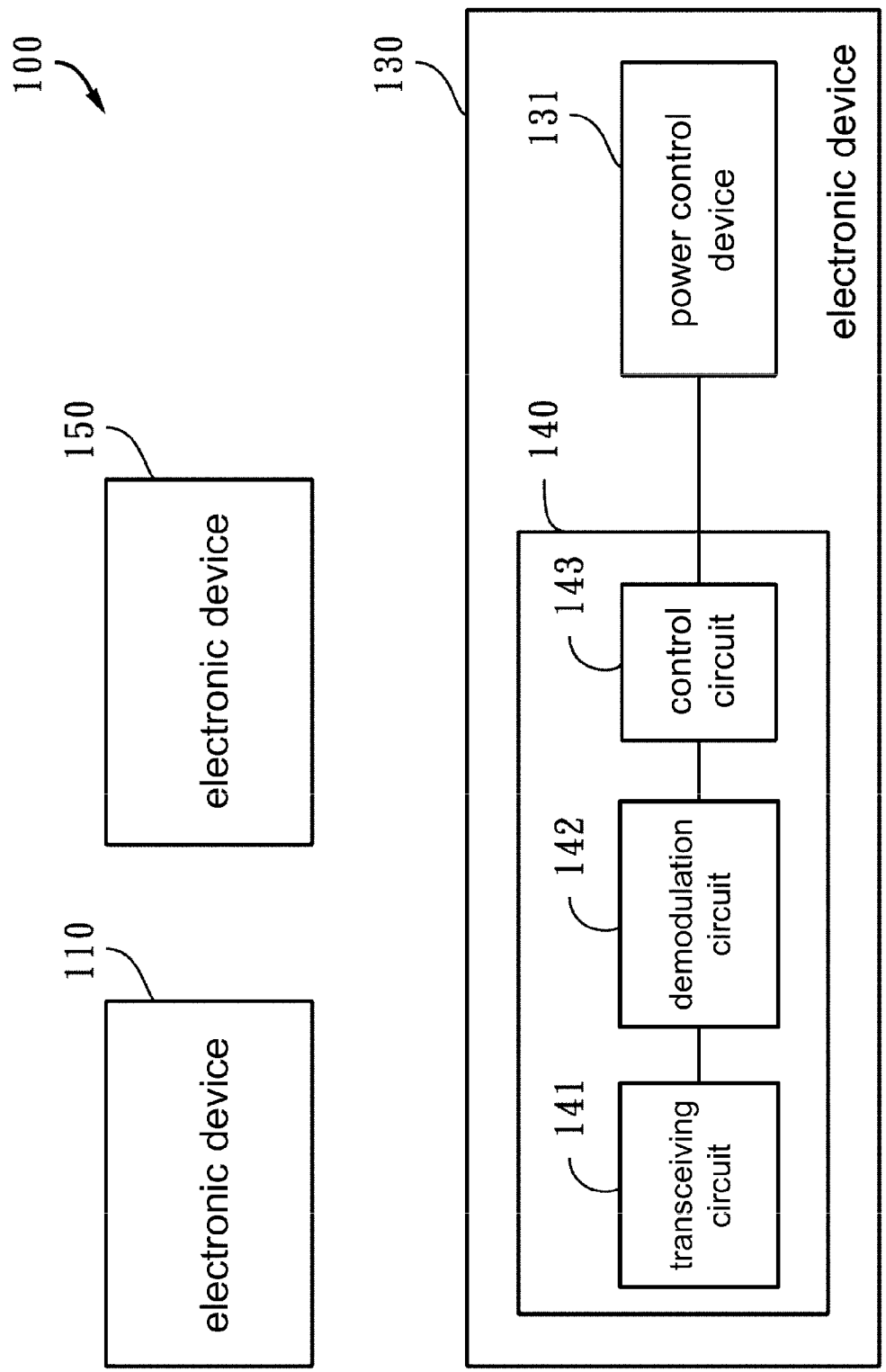
FIG. 1 shows a simplified functional block diagram of an example communication system.

FIG. 1 shows a simplified functional block diagram of an example communication system 100. The communication system 100 comprises electronic devices 110, 130, and 150. The electronic devices 110 and 150 respectively comprise one or more network access devices (not shown in FIG. 1). The electronic device 130 comprises a power control device 131 and a network access device 140. The network access device 140 comprises a transceiving circuit 141, a demodulation circuit 142, and a control circuit 143. Other components and connections are omitted in FIG. 1 for the purposes of conciseness and easier explanation.

The electronic device 110, 130, and 150 may be respectively realized with a computer, a printer, a multimedia player, or other electronic devices with the communication capability. In this embodiment, the electronic device 130 may operate in the normal operation mode and in the power saving mode. Furthermore, when the electronic device 130 stays in the power saving mode, the electronic device may be waked up according to the signals received by the network access device 140 and enter the normal operation mode.

The network access device 140 may be realized with any suitable wired or wireless network technologies for transceiving signals through wired and/or wireless communication media, e.g., the Ethernet adapter and the WLAN adapter.

The transceiving circuit 141 is used to receive network signals and transmit the received network signals to the demodulation circuit 142. For example, the transceiving circuit 141 may comprise an RF circuit and an antenna. The transceiving circuit 141 may also be used to transmit signals to the communication channel in other embodiments.

The demodulation circuit 142 receives and demodulates the network signals from the transceiving circuit 141. The demodulation circuit 142 may perform analog and/or digital signal processing operations on the network signals. The demodulation circuit 142 may reduce the channel effect and recover the received network signals to the original message transmitted by the network signal transmitter (not shown in FIG. 1).

The control circuit 143 determines whether the electronic device 130 should operate in the normal operation mode or in the power saving mode according to the message demodulate by the demodulation circuit 142.

The power control device 131 may configure one or more components of the electronic device 130 (not shown in FIG. 1) to operate in the normal operation mode or in the power saving mode according to the control signal of the control circuit 143.

The power control device 131, the transceiving circuit 141, the demodulation circuit 142, and the control circuit 143 may be respectively realized with one or more discrete components and/or integrated components, and may be respectively configured in the interior and/or in the exterior of the electronic device 130.

Figure 2:
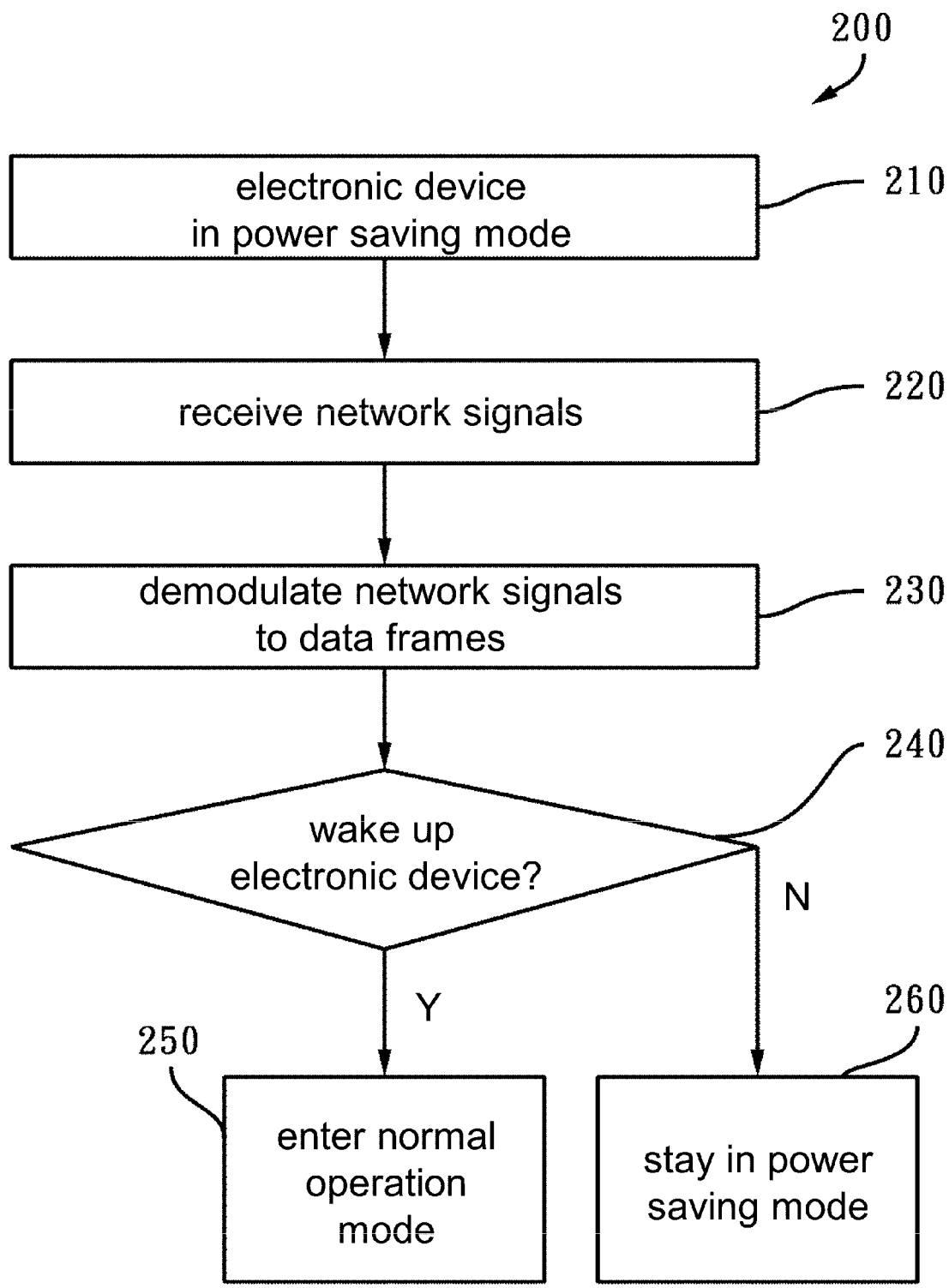
FIG. 2 shows a simplified flowchart of an example wake-up method of the communication system in FIG. 1.

FIG. 2 shows a simplified flowchart of an example wake-up method 200 of the communication system 100 in FIG. 1. The operation of the communication system 100 is further explained below with FIGS. 1 and 2.

In the operation 210, the electronic device 130 stays in the power saving mode.

In the operation 220, the transceiving circuit 141 receives network signals transmitted by other electronic devices, and transmits the received network signals to the demodulation 142.

In the operation 230, the demodulation circuit 142 demodulates the received network signals to generate one or more data frames of a suitable format. For example, the demodulation circuit 142 may demodulate the received network signals and generate the packets defined in the communication standards (e.g., the IEEE 802.3 standard and the IEEE 802.11 standard).

In the operation 240, the control circuit 143 determines whether the electronic device should be waked up according to the data frame(s) generated by the demodulation circuit 142. When the electronic device 130 needs to be waked up, the method proceeds to the operation 250. Otherwise, the method proceeds to the operation 260.

In the operation 250, the control circuit 143 transmits one or more control signals to the power control device 131. Accordingly, the power control device 131 configures one or more component of the electronic device 130 to operate in the normal operation mode.

In the operation 260, the electronic device 130 stays in the power saving mode.

Figure 3:
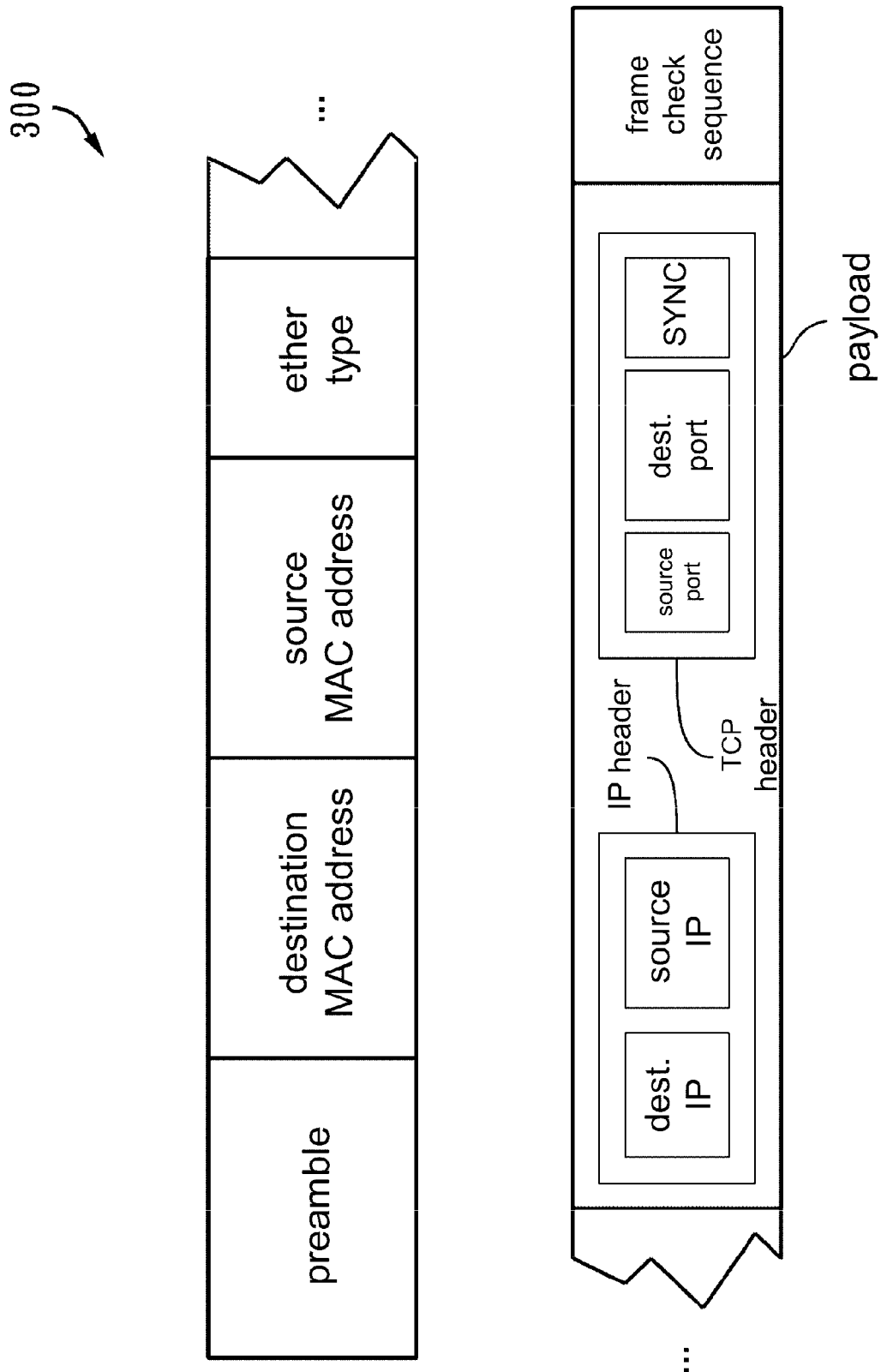
FIG. 3 shows a simplified schematic diagram of an example data frame generated by the demodulation circuit in FIG. 1.

FIG. 3 shows a simplified schematic diagram of an example data frame 300 generated by the demodulation circuit 142 in FIG. 1. In the embodiment, the data frame 300 complies with the Ethernet packet format defined in the IEEE 802.3 standard.

The data frame 300 comprises a plurality of fields, each of which may comprise the same or different amount of data. In the embodiment in FIG. 3, the preamble field comprises seven octets of data. The destination MAC address field and the source MAC address respectively comprise six octets of data. The ether type field comprises two octets of data. The frame check sequence field comprises four octets of data. The payload field may comprise thousands octets of data, data of upper layers, and headers of upper layers. In FIG. 3, the payload field comprises an IP header field and a TCP header field. The IP header field comprises a source IP address field and a destination IP address field (denoted as "dest. IP" in FIG. 3). The TCP header field comprises a source port field, a destination port field (denoted as "dest. port" in FIG. 3), and a SYNC field.

Figure 4:
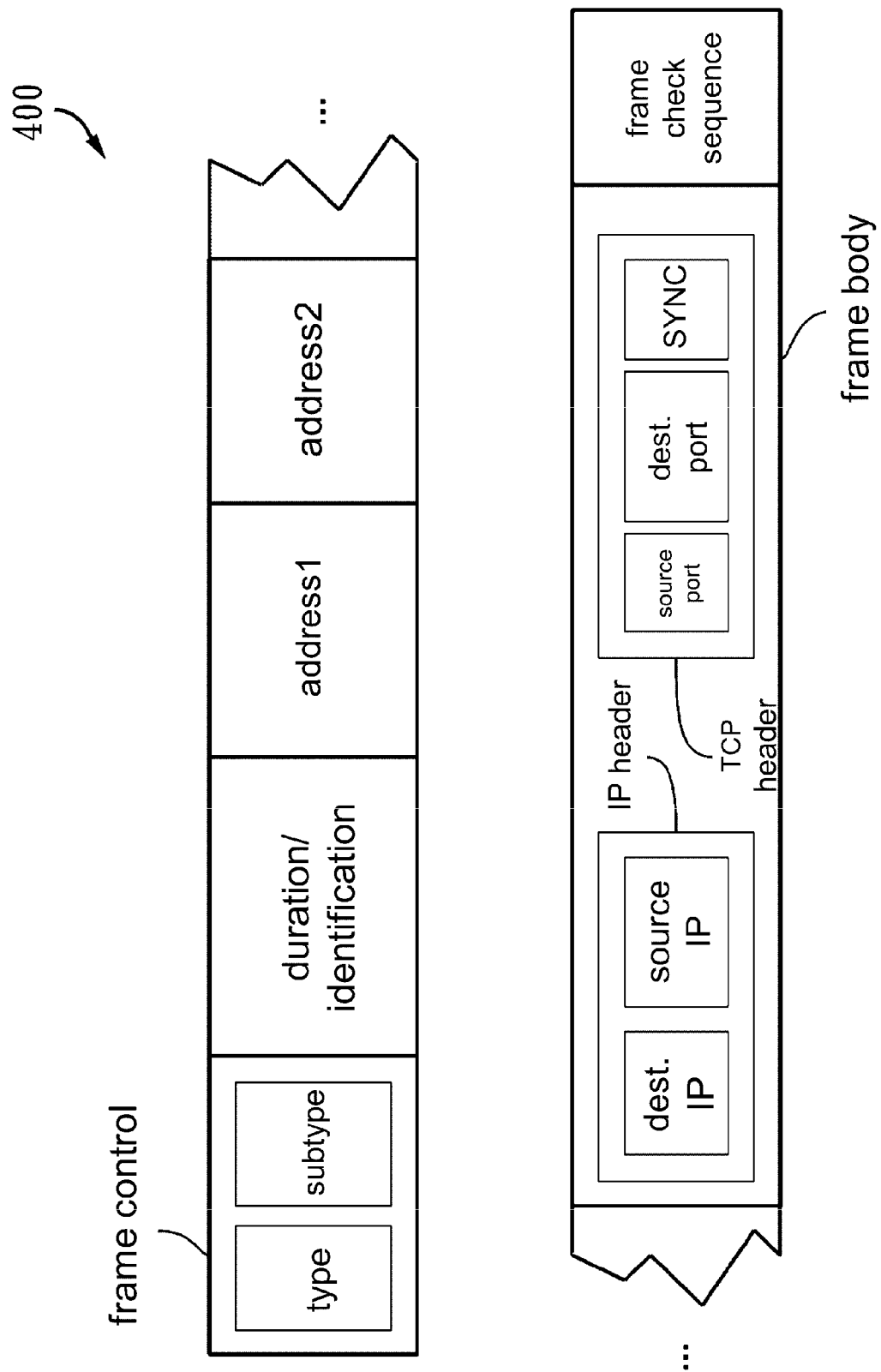
FIG. 4 shows a simplified schematic diagram of another example data frame generated by the demodulation circuit in FIG. 1.

FIG. 4 shows a simplified schematic diagram of another example data frame 400 generated by the demodulation circuit 142 in FIG. 1. In the embodiment, the data frame 400 complies with the WLAN packet format defined in the IEEE 802.11 standard.

The data frame 400 comprises a plurality of fields, each of which may comprise the same or different amount of data. In the embodiment in FIG. 4, the frame control field comprises two octets of data. The duration/identification field comprises two octets of data. The address1 field and the address2 field respectively comprise six octets of data. The frame check sequence field comprises four octets of data. The data in the frame body field may range from zero to thousands octets. The frame body field may comprise data, data of upper layers, and headers of upper layers. In FIG. 4, the frame body field comprises an IP header field and a TCP header field. The IP header field comprises a source IP address field and a destination IP address field (denoted as "dest. IP" in FIG. 3). The TCP header field comprises a source port field, a destination port field (denoted as "dest. port" in FIG. 4), and a SYNC field.

In the embodiment in FIG. 4, the frame control field comprises a two-bit "type" subfield and a four-bit "subtype" subfield. For example, when the content of the type subfield is "00" and the content of the subtype subfield is "1011", the data frame is defined as an authentication packet. When the content of the type subfield is "00" and the content of the subtype subfield is "0000", the data frame is defined as an association request packet The method 200 in FIG. 2 is further explained below with FIGS. 3 and 4. In the operation 240, the control circuit 143 may compare at least two fields of the data frame with predetermined values or with predetermined ranges to determine whether the data frame matches the criterion for waking up the electronic device 130. For example, the control circuit 143 may compare at least two of the source MAC address field, the destination MAC address field, the ether type field, the source IP address field, the destination IP address field, the source port field, the destination port field, the IP header field, the TCP header field, the frame control field, the address1 field, the address2 field of the data frame respectively with predetermined values or with predetermined ranges. When the content of the compared field equals to the predetermined value or locates in the predetermined range, the control circuit 143 determines the data frame matches the wake-up criterion.

In one embodiment, the electronic device 130 only accepts the remote wake-up request from predetermined procedures (e.g., instant messaging programs and print service routines) operating on predetermined electronic device, e.g., the electronic device 110. When the content of the source MAC address field of the data frame equals to the MAC address of the electronic device 110, the content of the destination MAC address equals to the MAC address of the electronic device 130, and the content of the ether type field equals to the predetermined value (e.g., the content of the ether type field equals the value representing IPv4 or IPv6), the control circuit 143 determines the data frame matches the wake-up criterion. The control circuit 143 transmits control signals to the power control device 131 and accordingly the power control device 131 wakes up one or more components of the electronic device 130.

In other embodiments, packets may lose in the transmission process because of various reasons. Therefore, in many communication standards, the electronic device resends the same content of packet if an acknowledge receipt message of the previous packet has not been received in a predetermined time. In the operation 240 in other embodiments, the control circuit 143 may compare at least two fields of data frames with predetermined values and/or with predetermined range. When two or more data frames (i.e., a packet and one or more resent packets) match the wake-up criterion, the control circuit 143 configures the power control device 131 to wake up the electronic device 130.

In other embodiments, the control circuit 143 may compare at least two fields of data frames with predetermined values and/or with predetermined ranges. When two or more data frames received in a predetermined time range match the wake-up criterion, the control circuit 143 configures the power control device 131 to wake up the electronic device 130.

The time between the electronic device sends a packet and resends the same content of the packet is usually not long. The two embodiments above may wake up the electronic device 130 more accurately at a minor cost of a little time delay.

In some embodiments, the electronic device transmits the packets in a predetermined order to wake up another electronic device. Thus, in the operation 240, the control circuit 143 may compare at least two fields of multiple data frames with predetermined values or with predetermined ranges. Besides, the control circuit 143 may compare the received order of the data frames with a predetermine order to determine whether the data frames match the wake-up criterion.

For example, in one embodiment, when the electronic device 110 needs to access the resource of the electronic device 130 (e.g., access the files and the printer of the electronic device 130), the electronic device 110 transmits the address resolution protocol (ARP) packet to obtain the MAC address of the electronic device 130. Afterward, the electronic device 110 transmits the TCP SYNC packet and other packets. Therefore, the control circuit 143 may first examine whether the content of the ether type field of a data frame is the code of an ARP packet, and then compare the content of the TCP header field of the next data frame to determine whether the next data frame is a TCP SYNC packet. When the electronic device 130 receives an ARP packet followed by a TCP SYNC packet, the control circuit 143 configures the power control device 131 to wake up one or more components of the electronic device 130.

In other embodiments, when the electronic device tries to establish connection with the electronic device 130, the electronic transmits an authentication packet followed by an association request packet. Thus, the control circuit 143 may first examine the content of the frame control field of a data frame to determine whether the packet is an authentication packet, and examine the content of the frame control field of the next data frame to determine whether the next packet is an association request packet. hen the electronic device 130 receives an authentication packet followed by an association request packet, the control circuit 143 configures the power control device 131 to wake up one or more components of the electronic device 130.

In the operation 240 in other embodiments, when the electronic device tries to establish a connection with the electronic device 130, the electronic transmits at least two packets. Thus, the control circuit 143 may compare at least one field of multiple data frames with the predetermined value(s) or with the predetermined range(s) to determine whether the data frames match the wake-up criterion of the electronic device 130.

In the embodiments above, the control circuit 143 determines whether the electronic device 130 should operate in the normal operation mode or in the power saving mode according to the message demodulate by the demodulation circuit 142. In other embodiment, to further conserve the energy, the demodulation circuit 142 may also perform signal processing operation on the network signals to generate intermediate signals instead of the demodulated messages. For example, the demodulation circuit 142 may compare the network signals with a predetermined waveform. When one or more network signals comprise the predetermined waveform(s), the control circuit 143 determines the electronic device 130 should operate in the normal operation mode and wakes up one or more components of the electronic device 130. Moreover, the control circuit 143 may also determine the electronic device 130 should operate in the normal operation mode when the first network signal and the second network signal are received within a predetermined time range. To match the wake-up criterion, the control circuit 143 may also require the network signals are received in a predetermined order, require the network signals comprise the same or different waveforms, etc.

In other embodiments, the electronic device resends a plurality of packet in a predetermined order if an acknowledge receipt message of the previous packets has not been received in a predetermined time or if the connection was not established successfully. Thus, the control circuit 143 may compare at least one field of multiple data frames with the predetermined value(s) or with the predetermined range(s), and examine whether the data frames are received in the predetermined order to determine whether the data frames match the wake-up criterion of the electronic device 130. The wake-up criterion may also be configured to be matched when the electronic device 130 receives the data frames in a predetermined order for two or more times.

In other embodiment, the control circuit 143 compares at least one field of multiple data frames with predetermined values or with predetermined ranges, examines whether the data frames are received in the predetermine order, and examines whether the data frames in the predetermined order are received for two or more times in a predetermined time range. When the above conditions are met, the control circuit 143 configures the power control device 141 to wake up one or more components of the electronic device 130.

The above embodiments may be suitably combined according to different design considerations or different application environments. For example, the control circuit may examine whether the data frame is an ARP packet, and also compare the source MAC address of the data frame with the predetermined values or with the predetermined ranges.

In other embodiments, the electronic device 130 may be waked up by a plurality of electronic devices, e.g. the electronic devices with the IP address locates between 192.168.1.19 and 192.168.1.100. Thus, the control circuit 143 may examine whether the source IP address of the data frame locates in the predetermined range and whether the destination IP address equal to the IP address of the electronic device 130.

In other embodiments, the electronic device 130 may be configured to be waked up by some specific procedures from any electronic devices. Thus, the control device 143 may compare the destination MAC address field, the ether type field, the source port field, and/or the destination port field with predetermined values or with predetermined ranges.

In the above embodiment, when the control circuit 143 examine whether the packet are received in the predetermined order, the control circuit 143 may further require that the packets are received uninterruptedly in the predetermined order or that the packet received in the predetermined order may be separated in time.

In the above embodiments, the electronic device 130 may comprise a plurality of power saving modes. For example, when the electronic device 130 in a first power saving mode is waked up by another electronic device, the electronic device 130 enter the second power saving mode so that one or more components of the electronic device 130 consume more power than in the first power saving mode.

The above embodiments may be easily combined with other power saving mechanisms to further reduce the power consumption. For example, the electronic device 130 may adopt the IEEE 802.11 power saving mechanism. When the electronic device 130 stay in the power saving mode, the network access device 140 only turns on at predetermined intervals to receive the network signals, and turns off otherwise (if not waked up) to further reduce the power consumption. The predetermined intervals in which the network access device 140 turns on may be separated to each other with a fixed duration of time or with a variable duration of time according to different design considerations and application environments.

The embodiments above illustrate a plurality of remote wake-up mechanisms. The electronic device may be waked up more accurately by comparing one or more fields of one or more data frames and the received order of the data frames. The false alarm and the power consumption may be reduced. Besides, the embodiments may be easily combined with other power saving mechanisms to further conserve energy.

The same reference numbers may be used throughout the drawings to refer to the same or like parts or components/operations. Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . " Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A network access device, comprising:
   a demodulation circuit for generating a first data frame according to network signals received by a transceiving circuit; and
   a control circuit, coupled with the demodulation circuit;
   wherein the first data frame matches a first wake-up criterion when at least two of a source MAC address field, a destination MAC address field, an ether type field, a source IP address field, a destination IP address field, a source port field, a destination port field, an IP header field, an TCP header field, a frame control field, a source address field, and a destination address field of the first data frame respectively equal to predetermined values or locate in predetermined ranges;
   wherein the demodulation circuit generates a second data frame; and the second data frame matches a second wake-up criterion when at least two of a source MAC address field, a destination MAC address field, an ether type field, a source IP address field, a destination IP address field, a source port field, a destination port field, an IP header field, an TCP header field, a frame control field, a source address field, and a destination address field of the second data frame respectively equal to predetermined values or locate in predetermined ranges; and
   wherein the control circuit wakes up at least one component of an electronic device when the first data frame matches the first wake-up criterion, the second data frame matches the second wake-up criterion, and the first data frame and the second data frame are received in a predetermined order within a predetermined time range.

2. The network access device of claim 1, wherein the transceiving circuit only receives the network signals at a plurality of predetermined intervals; and the predetermined intervals are separated by a fixed duration of time.

3. The network access device of claim 1, wherein the transceiving circuit only receives the network signals at a plurality of predetermined intervals; and the predetermined intervals are separated by a fixed duration of time.

* * * * *